United States Patent [19]

Smalley et al.

[11] Patent Number: 4,843,366
[45] Date of Patent: Jun. 27, 1989

[54] CONTROLLER FOR USE WITH DIMMER MODULE

[75] Inventors: Robert F. Smalley, Louisville; James Tobor, Dallas, both of Tex.

[73] Assignee: Prescolite Inc., San Leandro, Calif.

[21] Appl. No.: 157,744

[22] Filed: Feb. 18, 1988

[51] Int. Cl.[4] ............................................. H01C 10/16
[52] U.S. Cl. .................... 338/128; 338/131; 338/133
[58] Field of Search ............... 338/128, 131, 179, 162, 338/133, 135; 315/295

[56] References Cited

U.S. PATENT DOCUMENTS

| | | | |
|---|---|---|---|
| 3,090,025 | 5/1963 | Dole | 338/133 X |
| 3,117,298 | 1/1964 | Grundwald | 338/133 X |
| 3,307,133 | 2/1967 | Wolff | 338/131 X |
| 3,743,976 | 7/1973 | Meyer et al. | 338/179 X |
| 3,746,923 | 7/1973 | Spira et al. | 315/291 |
| 3,970,985 | 7/1976 | Sage | 338/162 |
| 4,455,546 | 6/1984 | Roszel | 338/179 |
| 4,575,660 | 3/1986 | Zabarchuk et al. | 315/295 |

OTHER PUBLICATIONS

Prescolite Controls-M-Pac, pp. 2-4, 1985.
Prescolite Controls-Low Voltage DC Controlled Prewired Systems, pp. 4-43; 1985.
Prescolite Controls Preset Series Incandescent Slide Dimming Controls and Wall Box Systems-pp. 2-8.
Prescolite Controls-Series 7, pp. 2-4, 1985.

Primary Examiner—E. A. Goldberg
Assistant Examiner—M. M. Lateef
Attorney, Agent, or Firm—Bielen and Peterson

[57] ABSTRACT

A wall box mounted voltage controller used in conjunction with a remotely located dimmer module for controlling multiple loads. The controller utilizes a printed circuit board structure and a multiplicity of control operators extendable from the printed circuit board structure. Each operator is linked to a potentiometer which in turn generates a electrical signal to control the intensity of the load via the dimmer module. High and low trim mechanisms for each signal are supported to the printed circuit board structure and are readily available for mechanical adjustment.

4 Claims, 2 Drawing Sheets

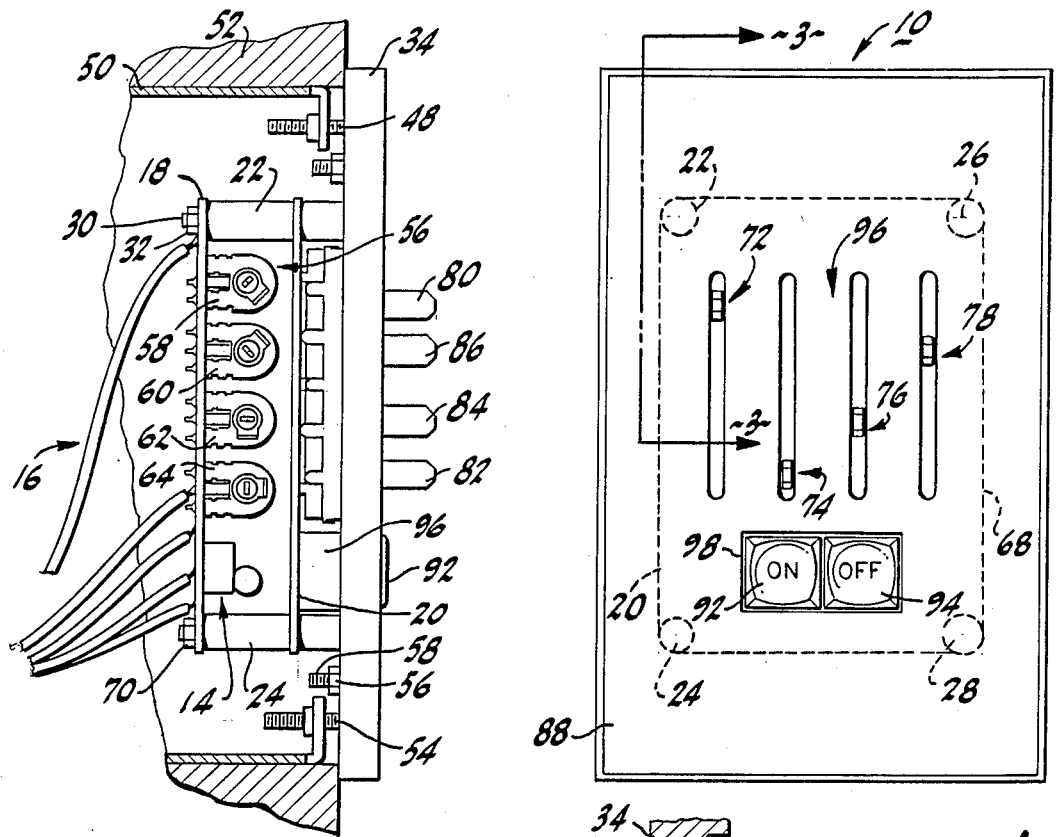
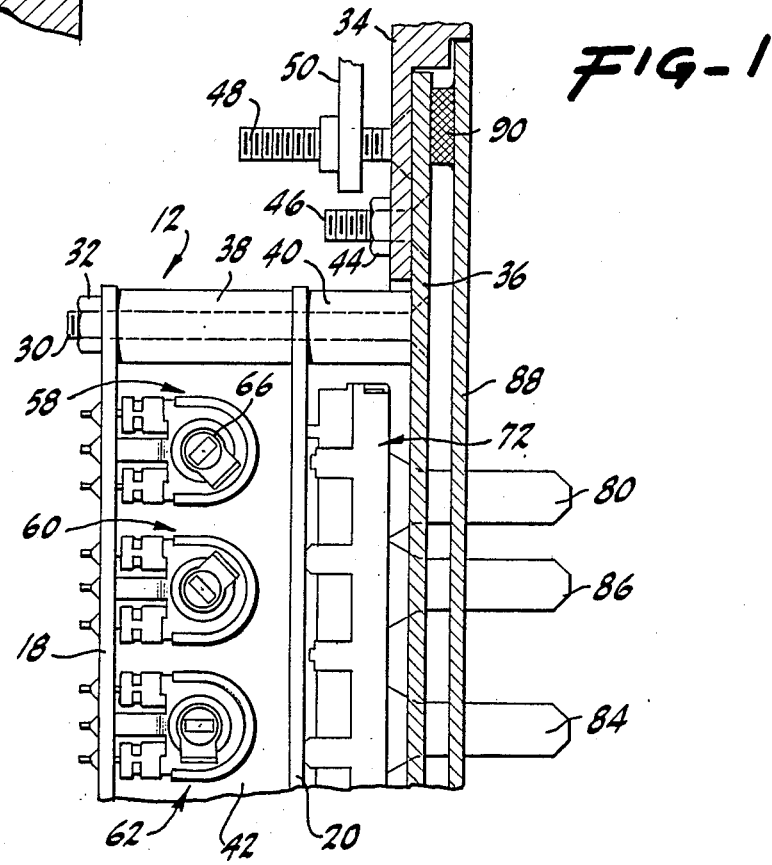
FIG-2
FIG-1
FIG-3

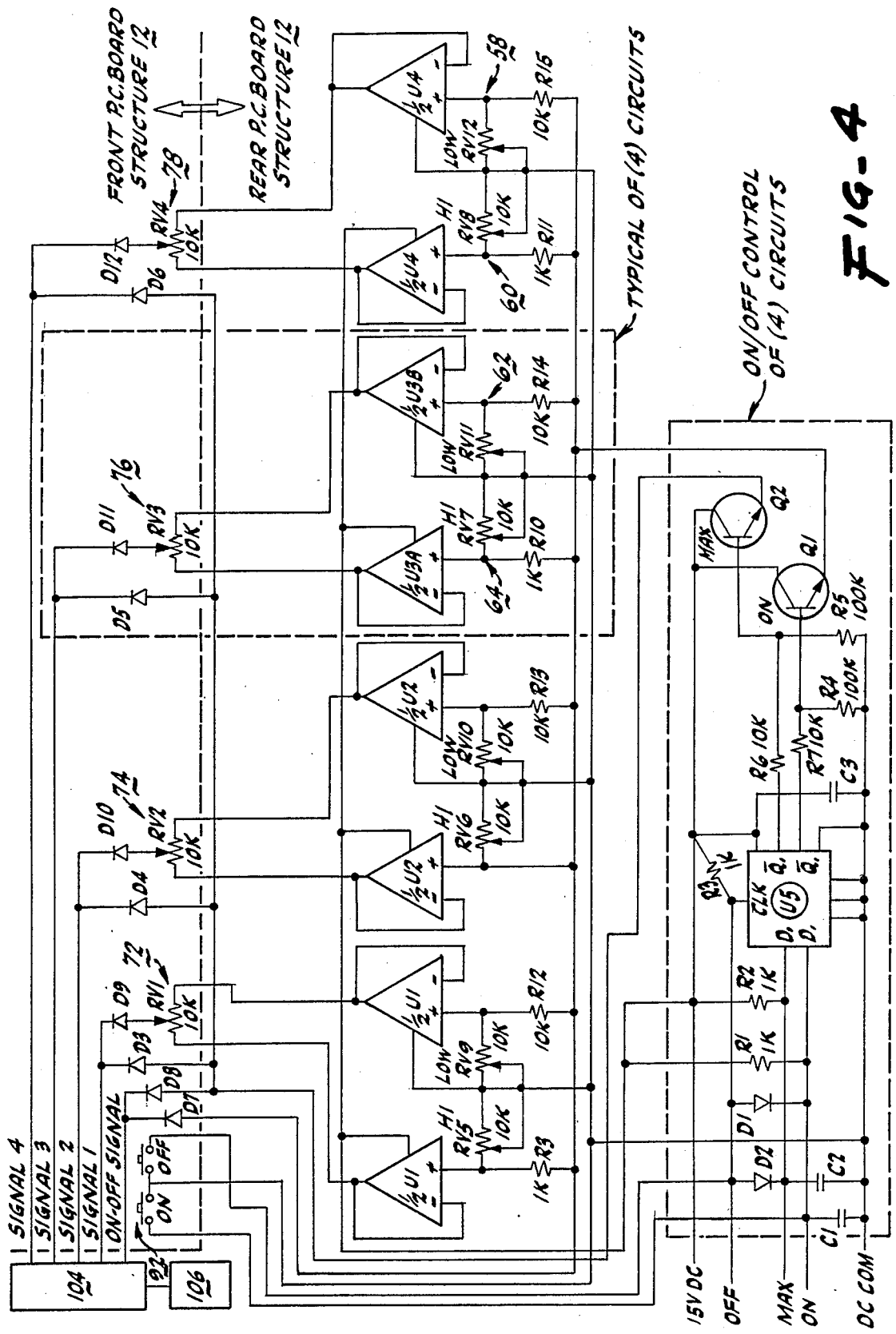

CONTROLLER FOR USE WITH DIMMER MODULE

BACKGROUND OF THE INVENTION

The present invention relates to a novel multi channel voltage controller which includes trim adjustments for each channel.

Voltage controllers or dimmers for lighting systems have been employed in the past. Generally, such dimmers use a rotary or slide switch to control the lighting level. For example, U.S. Pat. No. 3,746,923 describes a linearly moveable slider knob to control the lighting level in a space.

U.S. Pat. No. 4,455,546 illustrates a sliding voltage control operator used in conjunction with an on-off switch which permits the user to predetermine or preset the lighting level. In this case, operation of the on-off switch returned the lights to a level set by the slider. Both dimmer switches shown in the U.S. Pat. Nos. 3,746,923 and 4,455,546 patents include a trim adjustments to set either the high or low limits of the slider dimmer operation and, thus, the high or low intensities levels of lights controlled by the slider.

Dimmer systems have also been manufactured to control multiple channels of lighting. U.S. Pat. No. 4,575,660 illustrates an example of one of many such systems. Normally, a multiple channel system includes a low voltage controller which is physically separated from a high voltage dimmer module or panel. The lights or other voltage consuming loads are connected directly to the high voltage dimmer module. In the past, the high and low trim adjustments have been found on the remotely located dimmer module, which is considered an inconvenience since a single person must travel back and forth between the controller and dimmer module to properly set the trim characteristics of the dimming system.

A multiple channel dimming controller having conveniently located trim adjustments would be an advance in the lighting field.

SUMMARY OF THE INVENTION

In accordance with the present invention a novel and useful multi channel voltage controller is provided which solves many problems encountered in the prior art.

The voltage controller of the present invention may be wall boxed mounted and employed with a dimmer module or panel remotely located relative to the controller. Controller of the present invention also is capable of controlling multiple loads in the form of lights, fans, motors, and the like.

Controller of the present invention employs a printed circuit board structure which may include a pair of plates separated by a hiatus/ gap. Plates are supported to one another by a structural member such as a post or a plurality of posts. The printed circuit board structure is then mounted to a plate for use in an electrical wall box of standard configuration. A multiplicity of control operators are also utilized in the present invention. Each operator is movable and extends from the printed circuit board structure. Each operator is associated with a potentiometer which is itself supported by the printed circuit board structure.

Means is also included in the present invention for generating an electrical signal from the electrical output of each of the multiplicity of potentiometers. The electrical signal is transmitted to a dimmer module or package. Each electrical signal is therefore referenced to the particular electrical output of each of the multiplicity of potentiometers. The means for generating the electrical signal is mounted on the printed circuit board structure, heretofore described.

Means is further provided for independently and mechanically trimming the low and high output of each of the electrical signals emanating from a particular potentiometer. The high and low signal trimming means are supported on the printed circuit board. The high and low signal trimming means may locate in the vicinity of the gap between the first and second plates forming the printed circuit board structure. The rotatable portion of the high and low trimming means would be oriented outwardly from the gap to facilitate mechanical adjustment of the same.

It may be apparent that a novel and useful wall box mounted voltage controller has been described.

It is therefore an object of the present invention to provide a wall box mounted voltage controller having multiple channel controls and possessing compactness.

Another object of the present invention is provide a wall box mounted voltage controller which is economical to the purchaser relative to the power and channel capacity of conventional wall box dimmers.

A further object of the present invention is to provide a wall box mounted voltage controller which is aesthetically unobtrusive.

Yet another object of the present invention is to provide a wall box mounted voltage controller for use in conjunction with a dimmer module which possesses high and low trim adjustments which are physically supported by the voltage controller structure.

The invention possesses other objects and advantages especially as concerns particular characteristics and features thereof which will become apparent as the specification continues.

BRIEF DESCRIPTION OF THE DRAWINGS

FIG. 1 is a front elevational view of the voltage controller of the present invention.

FIG. 2 is a left side view of the voltage controller of the present invention showing a portion of a wall box and wall in section.

FIG. 3 is a sectional view taken along line 3—3 of FIG. 1.

FIG. 4 is a schematic of the circuitry found in the voltage controller of the present invention.

For a better understanding of the invention reference is made to the following detailed description of the preferred embodiments thereof which will be referenced to the hereinabove describe drawings.

DESCRIPTION OF THE PREFERRED EMBODIMENTS

Various aspects of the present invention will evolve from the following detailed description of the preferred embodiments which are understood by referencing the drawings described above.

The invention as a whole is depicted in the drawings by reference character 10. The voltage controller 10 includes as one of its elements a printed circuit board structure 12, FIGS. 2 and 3. Structure 12 supports plurality of electrical components 14 as well as plurality of conductors 16, which will be further described in detail on FIG. 4. Structure 12 includes first plate 18 and second plate 20 which are supported in spaced relationship relative to one another by a quartet of posts; posts 22 and 24 being illustrated in FIG. 2. Posts 22, 24, 26, and 28 are depicted in phantom on FIG. 1. With reference to post 22, it may be seen that a threaded bolt 30 captures a nut 32 which rides on the surface of plate 18. The head of bolt 30 extends to trim frame 34 and is supported thereat by sub panel 36, FIG. 3. It should be noted that insulated spacers 38 and 40 separate plates 18 and 20 and subpanel 36. Thus, a gap or hiatus 42 is formed between plates 18 and 20. Nut and bolt 44 and 46 hold subpanel 36 to trim frame 34. Machine screw 48 fastens controller 10 to wall box 50 supported in wall 52, FIGS. 2 and 3. It should be observed that the structure heretofore described with reference to post 22 is identical to the structure of posts 24, 26, and 28.

Likewise, the structure of machine screw 54 and nut 56 and bolt 58 are compromible to structure shown for machine screw 48 and nut 44 and bolt 46.

A multiplicity of high and low trim potentiometers 56 are soldered to plate 18. Potentiometers 58, 60, 62, and 64 correspond to trim potentiometers RV12, RV8, RV11, and RV7 depicted in FIG. 4, which will be hereinafter described in detail. It should be noted that trim potentiometers RV5, RV9, RV6, and RV10 are also supported from plate 18 within gap 42 behind trim potentiometers 58, 60, 62, and 64. With reference to FIG. 3 it may be observed that trim potentiometer 58 includes a rotatable portion 66 operated by a screwdriver or similar tool. Trim potentiometer 58 faces outwardly from the gap 42 to permit access to rotatable portion 66. The same orientation is applicable to remaining trim potentiometers 60, 62 and 64 on the side of plate 18 depicted in FIGS. 2 and 3, as well as trim potentiometers RV 5, RV 9, RV 6, and RV 10. In other words, the latter trim potentiometers face outwardly from gap 42 and are positioned at the edge 68 of plate 18 opposite plate 70 where trim potentiometers 58, 60, 62, and 64 lie. It may be apparent that each trim potentiometer includes a rotatable portion similar to rotatable portion 66 which is readily accessible for adjustment by a screwdriver.

The controller of the present invention also includes slide potentiometers 72, 74, 76, and 78 which correspond to schematic representations RV 1, RV 2, RV 3, and RV 4, FIG. 4. Slide potentiometers 72, 74, 76 and 78 possess operators 80, 82, 84, and 86, respectively, which extend from printed circuit board structure 12 and through face plate 88. Face plate 88 is removably attached to sub panel 36 by the use of a plurality of magnetic strips, such as magnetic strip 90 shown in FIG. 3. Slide potentiometers 72, 74, 76, and 78 are mounted to plate 20 of printed circuit board structure 12 outside gap 42 formed between plates 18 and 20. ON operator 92 and OFF operator 94 also extend from ON-OFF switch 96 which is itself fixed to plate 20 of printed circuit board structure 12. Needless to say, face plate 88 includes plurality of oval openings 96 and rectangular opening 98 for the passage of slide potentiometer operators 80, 82, 84, and 86 and ON-OFF operators 90 and 92, respectively.

With reference to FIG. 4 it may be apparent that an electrical schematic of the circuitry employed within controller 10 is illustrated. In essence, the circuitry of signal controller 10 produces four signals, signal circuit 100 generating "signal 3" being typical of each of these signal generating circuits. Also, controller 10 includes an ON/OFF control latch 102 which generates an ON-OFF signal in addition to "signals 1-4". The heretofore described signals pass to a remotely located dimmer module or package 104, such as the MCD4, Dimmer Pack manufactured by Prescolite Controls, Carrollton Texas. Dimmer module 104 includes the power devices necessary to control quartet of loads 106, which may be lights, fans, motors, and the like.

ON-OFF control latch circuit 102 receives low voltage power in the form of a 15 VDC and a DC COM input. There is also depicted a separate ON, OFF and MAX inputs which may take the form of a remotely located ON-OFF switch and a MAX or panic switch, which bypasses the dimming functions of the signal circuits typified by circuit 100. ON-OFF contacts 92 and 94 are connected to remote ON-OFF signals. The ON-OFF operators 92 and 94 are normally open and operate quad latch U5 via timing capacitors C1 and C2 and voltage splitting resistors R1 and R2. Diodes D1 and D2 block the ON and OFF inputs as well as the MAX and OFF inputs to quad latch U5. Although latching occurs when the ON or OFF buttons 92 and 96 are contacted, operation of latch U2 begins when the ON-OFF operators 92 and 94 are released. The On function enters quad latch U5 through pin D1 and passes to transistor $Q_1$ via pin $\overline{Q}_1$. Resistors R4 and R7 serve as voltage splitters to control the voltage to the base of Q1. When transistors Q1 is "on", the circuits, such as circuit 100, generating signals 1-4 are operable. When the MAX signal enters latch U5, through pin $D_o$, $\overline{Q}_o$ leads to transistor Q2. Resistors R5 and R6 again serve as voltage splitters. When transistor Q2 is "on", transistor Q1 is "off". Therefore, the signal generating circuits are bypassed and the maximum voltage is passed to dimmer module 104 and loads 106. That is to say, the lights, fans, and the like will run at maximum intensity.

OFF signals generated by operator 94 or by the remote off signal entering ON-OFF latch circuit 102 pass to the CLK pin of quad latch U5. R3 and C3 serve as a timing delay to quad latch U5 in this regard. This OFF signal to quad latch U5 disarms transistors Q1 and Q2. However, OFF signal is passed to dimmer module package 104 and loads 106.

Returning to the mode of ON-OFF control latch circuit 102 where transistor Q1 has been activated, dimming or voltage control is achieved by the production of signals 1-4, each destined for a channel. With reference to signal circuit 100 typical of each of the four signal generating circuits, it may be interpreted that DC voltage is passed to legs 108 and 110. Trim potentiometers RV7 and RV11 control the high and low limits of slide potentiometers RV3 which is manually manipulated by operator 84, FIGS. 2 and 3. Resistors R10 and R14 serve as voltage dividers. The adjustment of trim potentiometers RV7 and RV11 regulates the input to voltage following operational amplifier U3. The U3 amplifier is depicted as being split into "A" and "B" portions. Thus one-half of the U3 output controls the high and the other one-half of the U3 output controls the low limits of slide potentiometer RV3. Diodes D7-D12 block the MAX signal from the slide potentiometers.

In operation, the user dims or adjust the voltage to loads 106 by the use of operators 80, 82, 84, and 86. The high and low trim of the potentiometers associated with such operators are adjusted by the trim potentiometers RV5-RV12 which are located within gap 42 at the perimeter of plate 18 of circuit board structure 12. Thus, the trim for four channels is easily achieved without having to physically travel to dimmer module package 104, which was the case in the prior art. The ON-OFF function is easily achieved by pressing the ON or OFF operators 92 or 94, as desired by the user. The controller 10 may also be operated remotely by an ON, OFF, or MAX, signal operator producing the appropriate signal to the ON-OFF control latch circuit 102.

Below is a table further detailing elements employed in the schematic FIG. 4:

TABLE OF ELEMENTS

TRIM POTS: RV5-RV12, 10K OHM
RESISTORS: R1-R3 & R12-R15, 1K, ¼watt, 5%
RESISTORS: R6-R11, 10K ¼watt, 5%
RESISTORS: R4-R5, 100K, ¼watt, 5%
CAPACITORS: C-C3 0.1 Micro fd
DIODES: D1-D12 IN 4148
QUAD LATCH: U-5 MC 14042B; Motorola Corp; Austin Tex.
DUAL OP.AMPS: U1-U4; LM 358N; National Semi-Conductor; Santa Clara, Calif.
TRANSISTORS: Q1 & Q2 MPS 8097 TIS 97; Motorola Corp; Austin Tex.
SLIDE POTENTIOMETERS: RV1-RV4; Alps Electric Co. Ltd; Tokyo, Japan.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A wall box mounted voltage controller for use with a dimmer module for controlling multiple loads comprising:
   a. a printer circuit board structure;
   b. a multiplicity of control operations, each of said multiplicity of operators being movable and extending from said printed circuit board structure.
   c. a multiplicity of potentiometers supported by said printed circuit board structure each of said multiplicity of potentiometers being connected to one of said multiplicity of operators for adjusting the electrical output of each of said multiplicity of potentiometers, means for generating an electrical signal from the electrical output of each of said multiplicity of potentiometers for transmission to the dimmer module, each of said electrical signals having electrical output referenced to said electrical output of one of said multiplicity of potentiometers, said electrical signal generating means being mounted on said printed circuit board structure;
   e. means for independently mechanically trimming the low output of each of said electrical signals from each of said multiplicity of potentiometers.
   f. means for independently mechanically trimming the high output of each of said electrical signals from each of said multiplicity of potentiometers; each of said high and low electrical signal trimming means being supported on said printed circuit board structure.

2. The wall box mounted voltage controller of claim 1 which additionally comprises an ON-OFF switch for interrupting said electrical signals from said electrical signal generating means to the dimmer module.

3. The wall box mounted voltage controller of claim 2 in which said printed circuit board structure includes a first plate and a second plate, said first and second plates being supported by a structural member to form a gap therebetween, said high and low signal trimming means being located in said gap between said first and second plates and adjacent the perimeter of said first and second plates.

4. The wall box mounted voltage controller of claim 3 in which said high and low signal trimming means each includes a rotatable portion positioned to face outwardly from said gap.

* * * * *